Dec. 10, 1940.  M. WEINSCHENK  2,224,282
DREDGING, LIFTING, AND CONVEYING APPARATUS
Filed Sept. 22, 1938  3 Sheets-Sheet 1
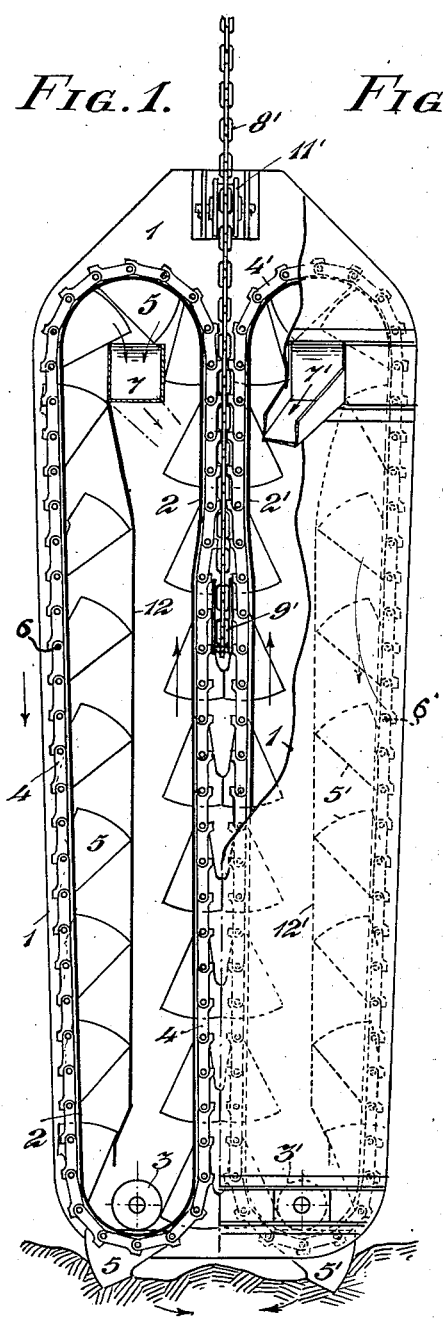
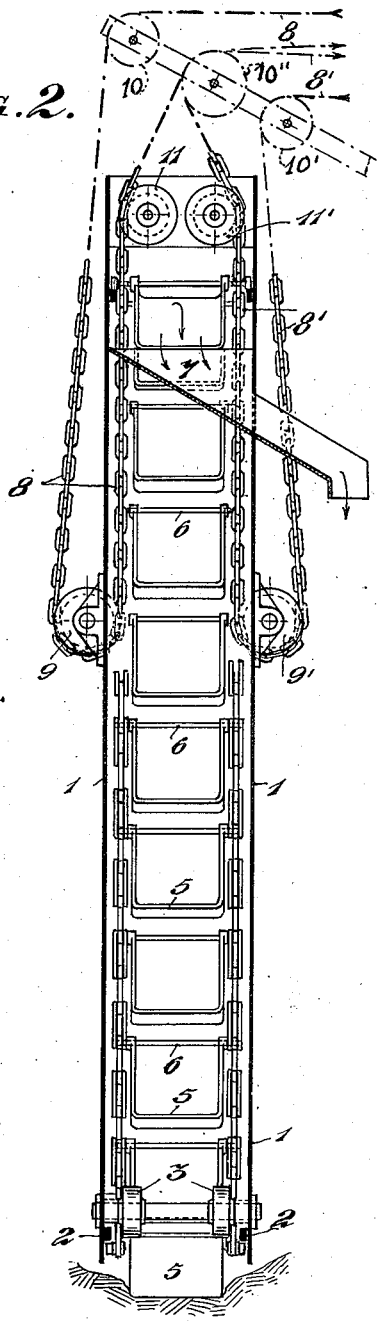
M. Weinschenk
Inventor

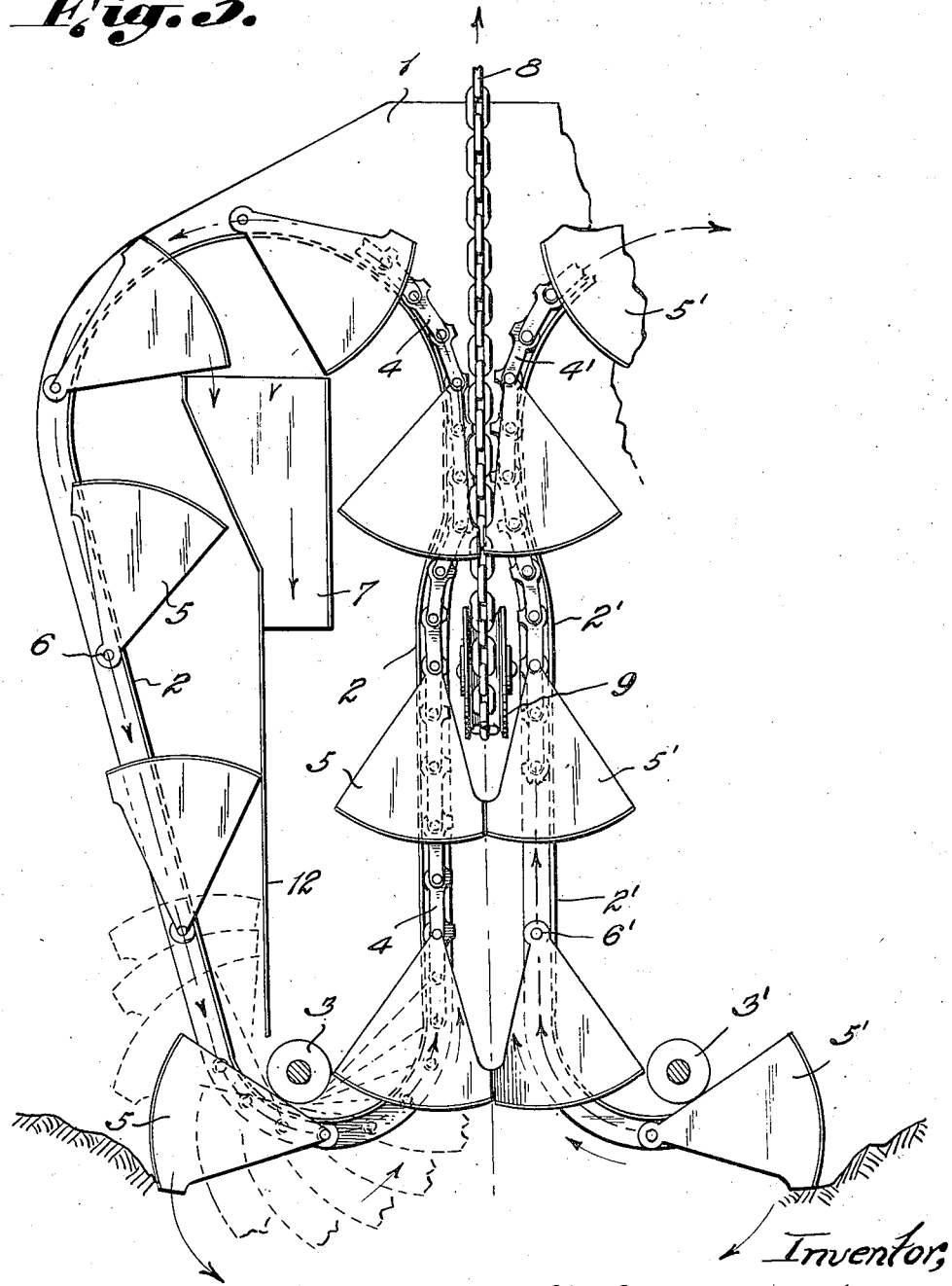

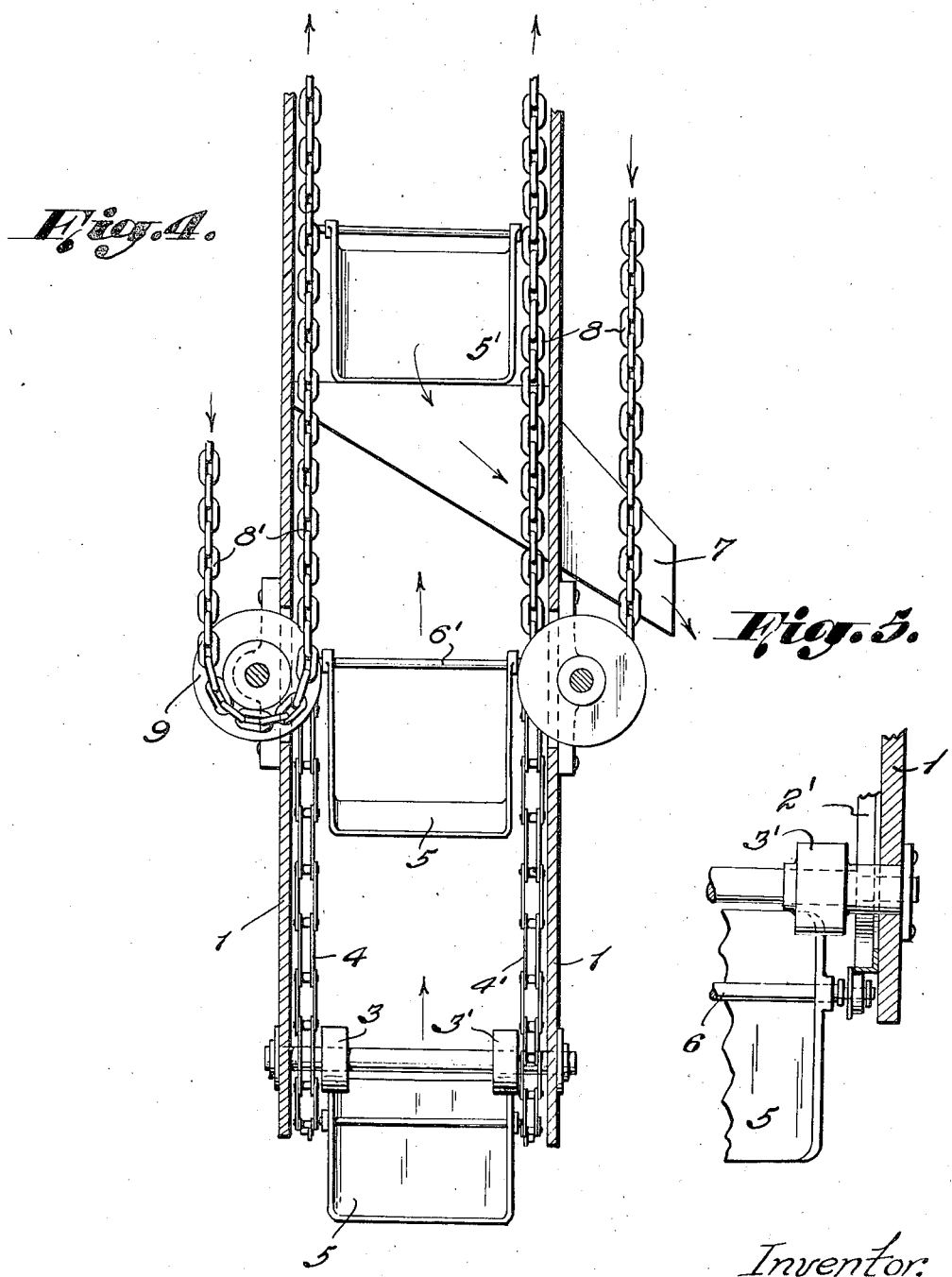

Patented Dec. 10, 1940

2,224,282

UNITED STATES PATENT OFFICE 2,224,282

DREDGING, LIFTING, AND CONVEYING APPARATUS

Martin Weinschenk, Buenos Aires, Argentina

Application September 22, 1938, Serial No. 231,235

7 Claims. (Cl. 37—69)

The present invention relates to new and useful improvements in dredging and conveying apparatus and the like, having for its object to provide apparatus of this character which is simple in construction and operation and which may be easily and quickly positioned over the material to be conveyed.

Another object of the invention is to provide two opposed series of scoop members arranged on respective endless driving elements, each scoop member of one series cooperating with a complementary scoop member of the other series to successively penetrate into the material to be removed.

A further object of the invention lies in the provision of two opposed series of scoop members arranged on respective endless driving elements travelling in opposite directions, each scoop member of one series cooperating with a complementary scoop member of the other series, whereby during part of their travel, said scoop members move together to form a single conveying bucket.

Still another object resides in means for guiding each series of scoop members in their travel, whereby the individual scoop members in one series successively approach the complementary scoop member in the other series, move together for a part of their travel, and spread apart to discharge their contents in respective delivery chutes.

With the above and other objects in view which will appear as the description proceeds, the present invention resides in the novel features hereinafter set forth, illustrated in the accompanying drawings and more particularly pointed out in the appended claims.

Referring to the drawings in which numerals of like character designate similar parts throughout the several views, Fig. 1 is a front elevation of the dredging and conveying apparatus, with part of the casing broken away.

Fig. 2 is a side elevation of the apparatus shown in Fig. 1, with the delivery chute shown in section and the driving chain and pulley arrangement shown diagrammatically.

Fig. 3 is an enlarged detail view with the casing removed, showing the path of travel of the scoop members and the guides for said members.

Fig. 4 is an enlarged detail view with the casing removed, showing the arrangement of the driving chains and the disposition of the discharge chutes, and Fig. 5 is a fragmentary view partly in section, showing one of the guide rollers in the bottom of the casing for urging the scoop members outwardly and then gradually inwardly.

Referring now, more particularly to the drawings, there is provided a vertical, substantially rectangular frame or casing 1, open at its lower extremity as clearly shown in Figs. 1 and 2. Disposed within said casing and suitably secured to the front wall thereof, are a pair of narrow endless metal bands arranged side by side in parallel relation and extending longitudinally for substantially the entire length of the casing. A second pair of narrow endless metal bands is secured to the rear wall of the casing, each narrow band of said second pair being disposed coaxial to the respective band of said first named pair to form therewith endless stationary guides or tracks 2 and 2' for a pair of endless conveyors 4 and 4', respectively, adapted to travel about the periphery of said tracks in opposite directions. Each conveyor consists of a pair of linked flexible chains or the like transversely spaced from one another and each chain is connected together by means of transverse bars 6 and 6', respectively, spaced longitudinally along each conveyor.

A series of substantially U-shaped scoop members 5 are pivotally carried on respective transverse bars 6 between the flexible chains of the conveyor 4, while a similarly supported series of complementary, substantially U-shaped scoop members 5' are pivotally carried on the transverse bars 6' and adapted to cooperate with the scoop members 5 as will later appear. Each scoop member is open at its front and rear portions, the sides being fan shaped and gradually tapering toward their upper extremities, terminating in bearing members pivotally supported on the transverse bars 6, 6'. The front face of each scoop member of one series is provided with a projecting nosepiece adjacent the bottom thereof adapted to cooperate with a similar nosepiece on the front face of the respective scoop member of the other series, whereby during a part of their travel with the endless conveyors 4 and 4', complementary scoop members 5 and 5' move together and form single conveying buckets.

As before stated, the endless conveyors 4 and 4' are adapted to travel in opposite directions and for this purpose any suitable driving means may be employed, that shown in the drawings comprising a pair of chains 8 and 8' connected to a suitable source of power (not shown) from which these chains run over pulleys 10, 10', respectively on the end of a derrick boom or the like shown diagrammatically in Fig. 2. From these pulleys, the chains extend downwardly along each side of the casing 1, run over pulleys 9, 9' supported in the front and rear walls, respectively, of the casing, pass inwardly into the casing, extend upwardly therein, run over guide pulleys or rollers 11, 11', respectively, supported in the upper portion of the casing, then out through suitable openings in the upper portion of the casing, run over the double pulley 10" on the derrick boom, and lead to the aforementioned source (not shown).

As will be seen from Fig. 1, the guides or tracks 2 and 2' are disposed closer to one another immediately above the pulleys 9, 9' to urge the conveyors 4 and 4', respectively, toward one another and each flexible chain of said conveyors is provided with a series of suitably spaced outwardly projecting lugs adapted to engage in the links of the chains 8 and 8', respectively, during the latters' travel upwardly within the casing, whereby said conveyors are driven by said chains in opposite directions as indicated by the arrows.

In the upper portion of the casing 1 and transversely disposed therein below the upper arcuate portion of the endless conveyors 4 and 4', there is provided a pair of funnel-shaped delivery chutes 7 and 7' extending downwardly in an inclined plane and projecting through suitable openings in the side walls of the casing 1, leading to any convenient loading apparatus (not shown). The upper portion of the chutes 7 and 7' lie in the path of travel of the scoop members 5 and 5', respectively, whereby during the travel of the endless conveyors 4 and 4', the rear faces of the scoop members 5 and 5' successively engage the edge of the respective chutes 7 and 7' and are gradually tilted rearwardly to deposit their contents into the chutes.

A pair of guides 12, 12' in the form of partitions are spaced inwardly from the side walls of the casing, and serve to maintain the respective scoop members in inverted position after tilting their contents into the chutes and during their travel downwardly. These guides extend downwardly from the respective chutes 7 and 7' and terminate adjacent the bottom of the casing 1. After leaving the guides 12 and 12', the scoop members are urged outwardly and forced to penetrate into the material to be conveyed by means of rotatable guides 3 and 3', respectively, each consisting of a pair of longitudinally spaced rollers rotatably supported on a transverse shaft mounted in the lower portion of the casing 1 and adapted to engage the rear faces of successive scoop members as they travel with the endless conveyors 4 and 4'. The scoop members are thus forced outwardly in opposite directions and then gradually inwardly toward one another.

It is believed in view of the foregoing description that a further detailed description of the invention is entirely unnecessary. Likewise it is believed that the advantages of the invention will be readily apparent.

Having thus fully described the invention what is claimed as new and desired to be secured by Letters Patent is:

1. Apparatus for dredging and conveying materials, comprising a frame, a pair of oppositely disposed endless elements operatively supported by said frame, means for driving said elements in unison but in opposite directions, a series of scoop members pivotally carried by each of said elements, each scoop member on one of said elements cooperating with a complementary scoop member on the other of said elements during part of their travel with said elements to form a single conveying bucket, discharge means cooperating with said scoop members for tilting the latter to remove the material therefrom, and guiding means for said endless elements supported by said frame, whereby during driving of said elements, the complementary scoop members of the series successively penetrate into the material to be conveyed, are progressively drawn together to move as a single conveying bucket, and subsequently spread apart adjacent said discharge means, and means for guiding said scoop members during their travel from said discharge means to the material to be conveyed.

2. Apparatus for dredging and conveying materials, comprising a frame, a pair of oppositely disposed endless elements operatively supported by said frame, means for driving said elements in unison but in opposite directions, a series of scoop members pivotally carried by each of said elements, each scoop member on one of said elements cooperating with a complementary scoop member on the other of said elements during part of their travel with said elements to form a single conveying bucket, discharge means on one end of said frame cooperating with said scoop members for tilting the latter to remove the material therefrom, means on the other end of said frame for forcing complementary scoop members outwardly to penetrate into the material to be conveyed and for drawing said complementary scoops together, and means for guiding said endless elements, whereby during driving of said elements, complementary scoop members of the series are progressively drawn together to move as a single conveying bucket and subsequently spread apart adjacent said discharge means, and means for guiding said scoop members during their travel from said discharge means to the material to be conveyed.

3. Apparatus for dredging and conveying materials, comprising a casing, a pair of oppositely disposed endless elements operatively supported in said casing, means for driving said elements in unison but in opposite directions, a series of scoop members pivotally carried by each of said elements, each scoop member on one of said elements cooperating with a complementary scoop member on the other of said elements during part of their travel with said elements to form a single conveying bucket, discharge means in one end of said casing cooperating with said scoop members for tilting the latter to remove the material therefrom, means on the other end of said casing for forcing complementary scoop members outwardly through an opening in the casing to penetrate into the material to be conveyed and for drawing said complementary scoops together, means in said casing for guiding each of said endless elements, whereby during driving of said elements the complementary scoop members of the series are progressively drawn together to move as a single conveying bucket and subsequently spread apart adjacent said discharge means, and means for supporting said casing in place, and means for guiding said scoop members during their travel from said discharge means to the material to be conveyed.

4. Apparatus as claimed in claim 3 wherein said endless elements comprise a pair of conveyor chains, and means on said chains operatively connected to said driving means.

5. Apparatus as claimed in claim 3 wherein said means for forcing said complementary scoop members outwardly comprise a pair of rollers supported in said casing.

6. Apparatus for dredging and conveying materials, comprising a frame, a pair of oppositely disposed endless elements operatively supported by said frame, means for driving said elements in unison but in opposite directions, a series of scoop members pivotally supported by each of said elements, each scoop member on one of said elements cooperating with a complementary scoop member on the other of said elements during part of their travel with said elements to form a single conveying bucket, discharge means cooperating with said scoop members for tilting the latter to remove the material therefrom, a pair of rollers supported by said frame and engageable by complementary scoop members during their travel with said endless elements, to force said scoop members outwardly to penetrate into the material to be conveyed, and to progressively draw said complementary scoops together, guiding means for said endless elements supported by said frame, whereby during driving of said elements, said complementary scoop members are progressively drawn together to move as a single conveying bucket and subsequently spread apart adjacent said discharge means, and means on said frame for guiding said scoop members during their travel toward the material to be conveyed.

7. Apparatus as claimed in claim 6 wherein said driving means comprise chains interposed between said endless elements, and means on said elements engageable with said chains.

MARTIN WEINSCHENK.